United States Patent
Kaku

(10) Patent No.: US 7,982,772 B2
(45) Date of Patent: Jul. 19, 2011

(54) IMAGE CORRECTION APPARATUS AND IMAGE CORRECTION METHOD FOR CORRECTING IMAGE BLUR USING A MOBILE VECTOR

(75) Inventor: Toshihiko Kaku, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1491 days.

(21) Appl. No.: 11/092,577

(22) Filed: Mar. 29, 2005

(65) Prior Publication Data

US 2005/0225645 A1    Oct. 13, 2005

(30) Foreign Application Priority Data

Mar. 30, 2004  (JP) ................................. 2004-100514

(51) Int. Cl.
*H04N 5/228* (2006.01)
*H04N 9/47* (2006.01)
*H04N 5/225* (2006.01)

(52) U.S. Cl. ..................................... 348/208.4; 348/148
(58) Field of Classification Search .................. 348/148, 348/149, 208.99, 208.1, 208.4, 208.5, 248, 348/352; 340/937

See application file for complete search history.

(56) References Cited

U.S. PATENT DOCUMENTS

| | | | |
|---|---|---|---|
| 6,218,960 B1* | 4/2001 | Ishikawa et al. | 340/901 |
| 6,473,126 B1* | 10/2002 | Higashihara et al. | 348/345 |
| RE38,361 E * | 12/2003 | Hamada et al. | 396/52 |
| 7,015,952 B2* | 3/2006 | Okada | 348/208.1 |
| 7,206,018 B2* | 4/2007 | Kondo et al. | 348/208.4 |
| 7,339,612 B1* | 3/2008 | Yajima | 348/208.7 |
| 2002/0036692 A1* | 3/2002 | Okada | 348/208 |
| 2002/0047901 A1* | 4/2002 | Nobori et al. | 348/149 |

* cited by examiner

*Primary Examiner* — Lin Ye
*Assistant Examiner* — Carramah J Quiett
(74) *Attorney, Agent, or Firm* — Birch, Stewart, Kolasch & Birch, LLP

(57) ABSTRACT

An image correction apparatus which corrects blurring generated by the traveling of a vehicle in the captured image, including: a camera which captures an image of front of a vehicle continuously; mobile vector calculation means of calculating a mobile vector in an image of each object based on a position of an object in each image continuously captured by the camera; and blurring correction means of correcting blurring of the image captured by the camera using the mobile vector calculated by the mobile vector calculation means.

28 Claims, 12 Drawing Sheets

| ACCELERATION | EXPOSURE TIME SHORTENING LEVEL (%) |
|---|---|
| $0 \leqq \alpha < A$ | 100 |
| $A \leqq \alpha < B$ | 90 |
| $B \leqq \alpha < C$ | 81 |
| ⋮ | ⋮ |

*FIG. 10*

| AMOUNT OF STEPPING ON ACCELERATOR | EXPOSURE TIME SHORTENING LEVEL |
|---|---|
| $0 \leq V_1 < A_1$ | 100% |
| $A_1 \leq V_1 < B_1$ | 90% |
| $B_1 \leq V_1 < C_1$ | 80% |
| ⋮ | ⋮ |

FIG. 12A

| AMOUNT OF STEPPING ON BREAK | EXPOSURE TIME SHORTENING LEVEL |
|---|---|
| $0 \leq V_2 < A_2$ | 100% |
| $A_2 \leq V_2 < B_2$ | 90% |
| $B_2 \leq V_2 < C_2$ | 80% |
| ⋮ | ⋮ |

FIG. 12B

| STEERING ANGLE STEERING WHEEL | EXPOSURE TIME SHORTENING LEVEL |
|---|---|
| $0 \leq V_3 < A_3$ | 100% |
| $A_3 \leq V_3 < B_3$ | 90% |
| $B_3 \leq V_3 < C_3$ | 80% |
| ⋮ | ⋮ |

IMAGE CORRECTION APPARATUS AND IMAGE CORRECTION METHOD FOR CORRECTING IMAGE BLUR USING A MOBILE VECTOR

This patent application claims priority from a Japanese patent application No. 2004-100514 filed on Mar. 30 2004, the contents of which are incorporated herein by reference.

BACKGROUND OF THE INVENTION

1. Field of the Invention

The present invention relates to an image correction apparatus and an image correction method which captures an image of front of a vehicle. More particularly, the present invention relates to an image correction apparatus and an image correction method which corrects blurring of the image due to swing of the vehicle.

2. Description of Related Art

Conventionally, there is known a camera which follows a subject and corrects blurring by moving its optical system. By equipping such a camera in a vehicle, the image, of which blurring by swing of the vehicle is corrected, is acquirable.

Here, when capturing image of the front of the vehicle continuously from running vehicle, an object in the image seems to move from its center to its circumference in the image. For this reason, when the vehicle runs at high speed, blurring occurs to each object in the captured image. However, although the camera having function of the above-mentioned blurring correction can correct blurring when the camera moves horizontally and/or vertically with respect to the object, since the blurring occurs in different direction for each object when distance between each object and the camera changes, it cannot correct the blurring.

SUMMARY OF THE INVENTION

Therefore, it is an object of the present invention to provide an image correction apparatus and an image correction method which can solve the foregoing problems. The above and other objects can be achieved by combinations described in the independent claims. The dependent claims define further advantageous and exemplary combinations of the present invention.

According to a first aspect of the present invention, there is provided an image correction apparatus. The image correction apparatus includes: a camera which captures an image of front of a vehicle continuously; mobile vector calculation means of calculating a mobile vector in an image of each object based on a position of an object in each image continuously captured by the camera; and blurring correction means of correcting blurring of the image captured by the camera using the mobile vector calculated by the mobile vector calculation means. Thereby, the image correction apparatus according to the present invention can acquire an image without blurring. Especially, when the camera in the vehicle captures the image when the vehicle travels at high speed, large blurring occurs in the captured image. However, the image correction apparatus of the present invention can reduce such blurring. Moreover, since the image correction apparatus of the present invention can correct blurring, it can perform image capturing using exposure time longer than a camera without the function of the blurring correction. Thereby, even if it is dark outside, a bright image can be received.

Moreover, the mobile vector calculation means may calculate a vanishing point of an optical flow of the image captured by the camera, and may calculate direction of the mobile vector assuming that the mobile vector of each object is radially oriented from the vanishing point. Moreover, the mobile vector calculation means may calculate length of the mobile vector in radial direction based on a direction to which an object in each image continuously captured by the camera has been corrected. Thereby, the direction and length of the mobile vector of each object are easily calculated. Here, if a roadside object, in which the same patterns are repeated at equal intervals, such as for example, a safety zone, indication paint on the road, resembling vehicles, etc. are included in the image as an object, an outstanding point of other objects may be extracted accidentally when calculating the mobile vector. In such a case, even though there is an error in the calculated mobile vector, the image correction apparatus according to the present invention can easily correct the error of the direction and length of such a mobile vector.

The image correction apparatus may further include: distance measurement means of measuring distance from the vehicle to each object; speed measurement means of measuring speed of the vehicle; and optical flow calculation means of calculating a calculatory optical flow of each object based on speed measured by the speed measurement means and distance to each object measured by the distance measurement means, wherein the mobile vector calculation means may calculate a position of the object in a second image by calculating a position of the object, which is included in a first image, in a second image based on the optical flow calculated by the optical flow calculation means, and searching the same object in a region centering on the position. By using the optical flow in such a manner, it can calculate the position of the object quickly. Moreover, since the same object is searched in the region centering on the position which is defined by the optical flow, it can calculate the mobile vector of the object quickly and correctly.

The image correction apparatus may further include: steering angle measurement means of measuring steering angle of the vehicle; and swing speed calculation means of calculating swing speed of the vehicle based on speed measured by the speed measurement means and steering angle measured by the steering angle measurement means, wherein the optical flow calculation means may calculate a calculatory optical flow of each object further based on the swing speed calculated by the swing speed calculation means. Thereby, it can calculate the position of the object quickly and correctly.

The blurring correction means may correct blurring by adding an image, which is obtained by differentiating an image in each object to a direction of the mobile vector, to an original image. Thereby, blurring generated in each object is easily reducible.

The image correction apparatus may further include a display unit which displays an image, of which blurring has been corrected by the blurring correction means. Thereby, a clear image can be displayed to a driver of a vehicle.

The image correction apparatus may further include: exposure time control means of controlling exposure time of the camera; and acceleration measurement means of measuring acceleration of the vehicle; wherein the larger the acceleration of the vehicle measured by the acceleration measurement means is, the shorter the exposure time control means may control exposure time of the camera.

The acceleration measurement means may further measure change of swing speed of the vehicle, and the larger the change of swing speed of the vehicle measured by the acceleration measurement means is, the shorter the exposure time control means may control exposure time of the camera.

The acceleration measurement means may measure at least one of an amount of stepping on an accelerator of the vehicle, an amount of stepping on a brake, and a steering angle of a steering, and the larger at least one variation of an amount of stepping on the accelerator, an amount of stepping on the brake, and a steering angle of the steering wheel is, the shorter the exposure time control means may control the exposure time of the camera.

The blurring correction means may corrects blurring in the region near right side and left side of each of the images continuously captured by the camera more accurately than correction of blurring in a region near upper side and lower side of each of the images.

The blurring correction means may omit to correct blurring in a region near upper side and lower side of each of the images continuously captured by the camera.

The mobile vector calculation means may calculate a vanishing point of an optical flow of the image captured by the camera, and the blurring correction means corrects blurring in a region near the vanishing point of the optical flow less accurately than the other regions.

The blurring correction means may correct blurring in a central region of each of the images continuously captured by the camera less accurately than the other regions.

According to a second aspect of the present invention, there is provided an image correction method. The image correction method includes: a step of capturing an image of front of a vehicle continuously by a camera; a mobile vector calculation step of calculating a mobile vector in an image of each object based on a position of an object in each image continuously captured by the camera; a blurring correction step of correcting blurring of the image captured by the camera using the mobile vector calculated in the mobile vector calculation step; and a steering angle measurement step of measuring steering angle of the vehicle.

A vanishing point of an optical flow of the image captured by the camera may be calculated in the mobile vector calculation step, and direction of the mobile vector may be corrected assuming that the mobile vector of each object is radially oriented from the vanishing point.

Length of the mobile vector may be corrected in the mobile vector calculation step based on a direction to which an object in each image continuously captured by the camera has been corrected.

The image correction method may further include: a distance measurement step of measuring distance from the vehicle to each object; a speed measurement step of measuring speed of the vehicle; and an optical flow calculation step of calculating a calculatory optical flow of each object based on speed measured in the speed measurement step and distance to each object measured in the distance measurement step, wherein a position of the object in a second image may be calculated in the mobile vector calculation step by calculating a position of the object, which is included in a first image, in a second image based on the optical flow calculated in the optical flow calculation step, and searching the same object in a region centering on the position.

The image correction method may further include: a steering angle measurement step of measuring steering angle of the vehicle; and a swing speed calculation step of calculating swing speed of the vehicle based on speed measured in the speed measurement step and steering angle measured in the steering angle measurement step, wherein a calculatory optical flow of each object may be calculated in the optical flow calculation step further based on the swing speed calculated in the swing speed calculation step.

Blurring may be corrected in the blurring correction step by adding an image, which is obtained by differentiating an image in each object to a direction of the mobile vector, to an original image.

The image correction method may further include a displaying step of displaying an image, of which blurring has been corrected in the blurring correction step.

Blurring may be corrected in the blurring correction step in the region near right side and left side of each of the images continuously captured by the camera more accurately than correction of blurring in a region near upper side and lower side of each of the images.

Blurring correction may be omitted in the blurring correction step in a region near upper side and lower side of each of the images continuously captured by the camera.

A vanishing point of an optical flow of the image captured by the camera may be calculated in the mobile vector calculation step, and blurring may be corrected in the blurring correction step in a region near the vanishing point of the optical flow less accurately than the other regions.

Blurring may be corrected in the blurring correction steps in a central region of each of the images continuously captured by the camera less accurately than the other regions.

The summary of the invention does not necessarily describe all necessary features of the present invention. The present invention may also be a sub-combination of the features described above.

BRIEF DESCRIPTION OF THE DRAWINGS

FIG. 10 is a drawing showing a first example of control of exposure time by exposure time control means according to an alternative of the present embodiment of the present invention.

FIGS. 12A-12C are drawings showing other examples of control of exposure time by the exposure time control means according to an alternative of the present embodiment of the present invention.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
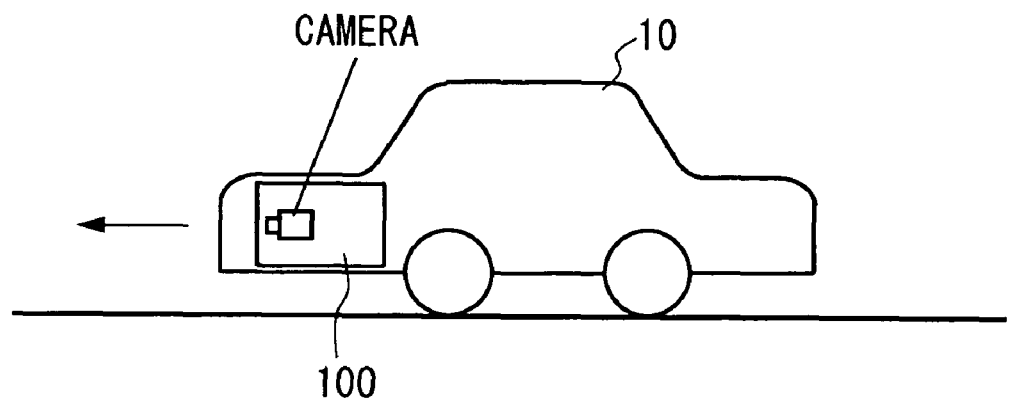
FIG. 1 is a drawing showing an image correction apparatus equipped in a vehicle according an embodiment of the present invention.
Figure 2:
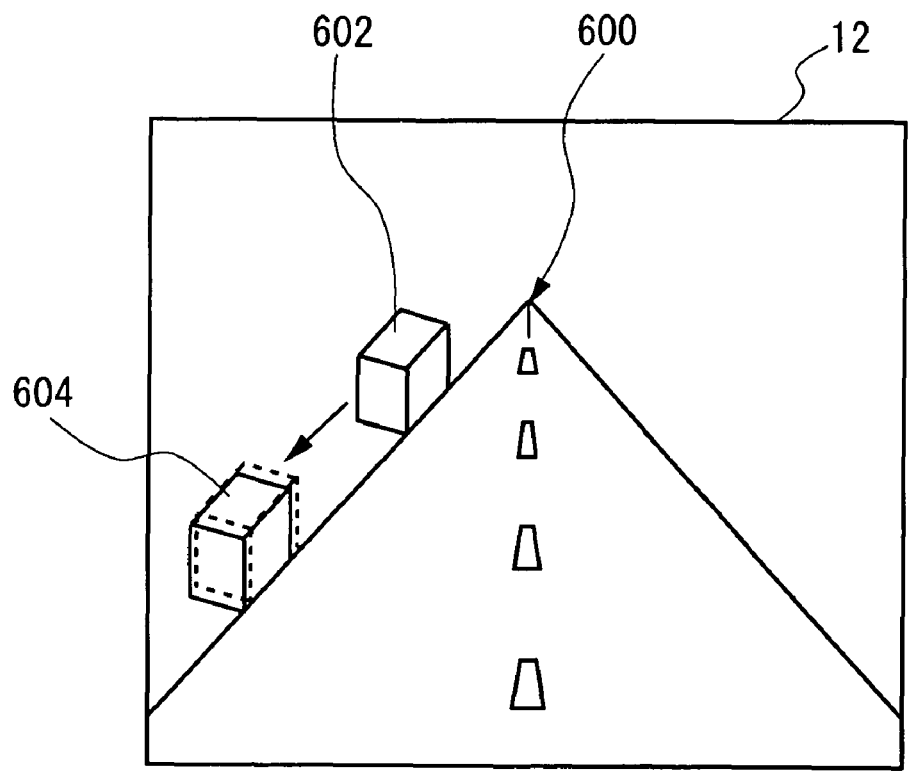
FIG. 2 is a drawing showing an image, which is an example of an image received by the image correction apparatus, according to an embodiment of the present invention.

FIG. 1 shows an example of an image correction apparatus 100 equipped in a vehicle 10 according to a present embodiment. The image correction apparatus 100 includes a camera therein, and captures an image of front of the vehicle 10 continuously. FIG. 2 shows an image 12, which is an example of the image received by the image correction apparatus 100 according to the present embodiment. If consecutive frames are captured by the camera while the vehicle 10 is moving, an object 602 in the center of the image will appear in the following frame as an object 604 which moved to the periphery of the image 12 when the vehicle 10 is going straight on at a fixed speed. When the speed of the vehicle 10 is high, blurring may occur in the captured object 604. Therefore, the object of the present invention is to provide the image correction apparatus 100 capable of providing a driver with an image of which the blurring of an object has been corrected.

The positions of the same object in a plurality of frames make a mobile vector according to the relative velocity of the object with respect to the vehicle 10. Then, when the object is in stationary state, magnitude of the mobile vector generated by the travel of the vehicle is small in the vicinity of the center of the image, and large in the circumference. Moreover, the nearer the distance from the vehicle 10 to the object is, the larger the mobile vector of each object becomes. Here, the movement of each object in the image, which is determined according to such a running condition of the vehicle 10 and the distance to the object, will be referred to as an optical flow, and actual movement of the object in the image will be referred to as a mobile vector. Then, the optical flow of each object is generated from the vanishing point 600 in radial direction when the traveling direction of the vehicle 10 is coincident with direction of optical axis of the camera. It is another object of the present invention to correct the blurring using the optical flow.

Figure 3:
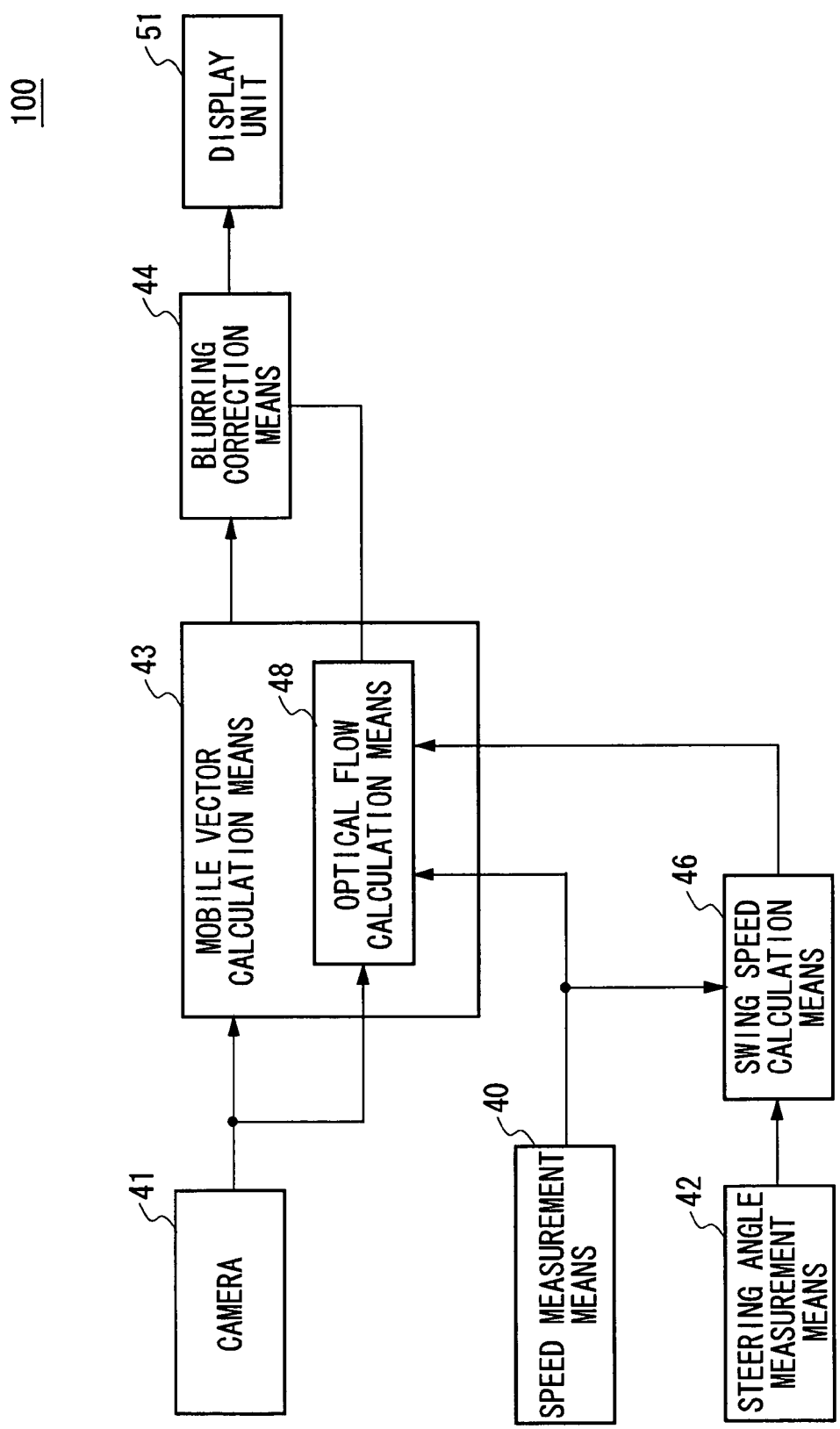
FIG. 3 is a drawing exemplary showing a functional configuration of the image correction apparatus according to an embodiment of the present invention.

FIG. 3 shows an example of a functional configuration of the image correction apparatus 100 according to the present embodiment. The image correction apparatus 100 of this example includes speed measurement means 40, a camera 41, steering angle measurement means 42, mobile vector calculation means 43, blurring correction means 44, swing speed calculation means 46, and a display unit 51.

The camera 41 is mounted with the vehicle 10 so that the optical axis may be coincident with the traveling direction of the vehicle 10 with which the image correction apparatus 100 is equipped, and it captures an image of front of the vehicle 10 continuously.

The mobile vector calculation means 43 calculates a mobile vector of each object in the image based on the position of the object in each image captured by the camera 41 continuously. The mobile vector calculation means 43 of this example calculates a mobile vector in each object by calculating difference of the positions of the same outstanding point between different frames. Accordingly, the optical flow of the image captured by the camera 41 is calculated. Here, the mobile vector calculation means 43 calculates the vanishing point of the image from the optical flow of the image. The mobile vector calculation means 43 of this example draws a straight line extending from the mobile vector of each object, and calculate the point, at which the total of square of the distances to straight lines becomes the minimum, as the vanishing point.

Here, if a roadside object, in which the same patterns are repeated at equal intervals, such as for example, a safety zone, indication paint on the road, resembling vehicles, etc. are included in the image as an object, the outstanding point of other objects may be extracted in the processing of calculating the mobile vector. In such a case, there is an error in the calculated mobile vector. Therefore, the image correction apparatus 100 according to the present invention corrects the direction and length of the mobile vector.

Figure 4:
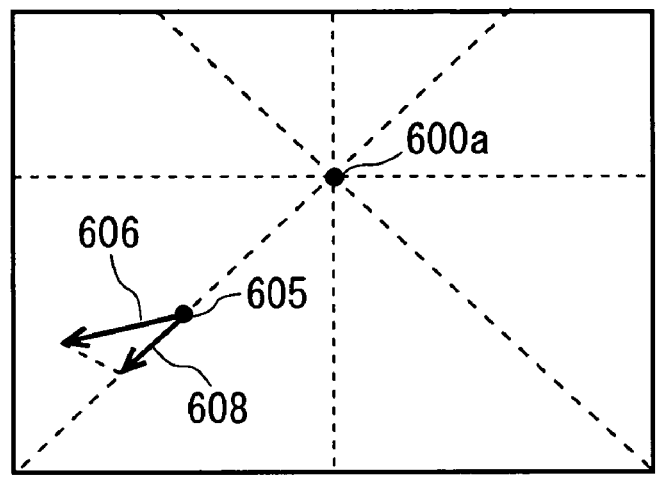
FIG. 4 is a drawing exemplary showing operation of correcting mobile vector according to an embodiment of the present invention.

FIG. 4 is drawing exemplary showing operation of correcting the mobile vector according to the present embodiment. The mobile vector calculation means 43 according to the present invention corrects the direction of the mobile vector assuming that the mobile vector of each object radially extends from the vanishing point. In this case, the direction of the corrected mobile vector is a direction towards the position of each object from the vanishing point. In the example described with reference to FIG. 4, when correcting a mobile vector 606, the mobile vector calculation means 43 makes the direction from the vanishing point 600a towards a position 605 of the object to be the direction of the corrected mobile vector.

Moreover, the mobile vector calculation means 43 corrects length of the mobile vector based on the corrected direction. The mobile vector calculation means 43 of this example corrects the length of the mobile vector by calculating component of the mobile vector before the correction for the corrected direction. In the example described with reference to FIG. 4, the length of the vector 608 corresponds to the corrected dimension. Thereby, the mobile vector calculation means 43 can calculate easily the direction and length of the mobile vector of each object.

The blurring correction means 44 corrects blurring of the image captured by the camera 41 using the mobile vector calculated by the mobile vector calculation means 43. Detailed operation of the blurring correction means will be described later. The display unit 51 displays the image after the blurring correction means 44 corrected the blurring for the driver. Thereby, a clear image can be displayed to the driver of the vehicle.

Thus, the image correction apparatus 100 according to the present invention can generate an image without blurring. The image correction apparatus 100 according to the present invention can reduce such blurring even if large blurring occurs in the captured image in particular when the speed of the vehicle 10 is high. Moreover, since the image correction apparatus 100 according to the present invention can correct blurring, the exposure time of the image correction apparatus 100 may be longer than a camera without the blurring correcting function. Thereby, even if it is dark outside, a brighter image can be displayed for the driver.

Moreover, the camera 41 according to the present invention may be a 3D camera including two cameras inside. In this case, the camera 41 calculates the distance from the vehicle 10 to an object using a gap between the positions of the outstanding points of the object captured by the two cameras. In this case, the camera 41 is an example of distance measurement means, and measures the distance to the object with respect to the vehicle 10 using the position gap of the outstanding points of the object captured by the two cameras.

The speed measurement means 40 measures speed of the vehicle 10, and the steering angle measurement means 42 measures steering angle of the vehicle 10. The swing speed calculation means 46 calculates swing speed of the vehicle based on the speed measured by the speed measurement means 40 and on the steering angle measured by the steering angle measurement means 42. The swing speed calculation means 46 of this example calculates the swing speed of the vehicle 10 by multiplying the speed measured by the speed measurement means 40 and differential of the steering angle measured by the steering angle measurement means 42.

The mobile vector calculation means 43 includes optical flow calculation means 48. Here, the position of the vanishing point in the image is defined in advance from the traveling direction of the vehicle 10 and the direction of the optical axis of the camera 41. In this case, when the vehicle 10 travels, the optical flow towards each object occurs for each object from the vanishing point. The length of this optical flow is defined by the speed of the vehicle 10, the distance from the vehicle 10 to the object, and the direction of the object with respect to the vehicle 10. Then, the optical flow calculation means 48 of this example calculates an calculatory optical flow of each object based on the speed measured by the speed measurement means 40, the distance to each object, and the direction of the object, i.e., the position of the object in the image. In this case, the calculatory optical flow is an optical flow in the image generated for each object when the vehicle 10 travels straight on.

Moreover, when the vehicle 10 swings in a minute time interval, the optical flow to the horizontal direction is generated for the object in the image. The direction of the optical flow is a direction opposite to the swinging direction, and the magnitude is proportional to the swing speed of the vehicle 10. Then, the swing speed calculation means 46 calculates the swing speed from the speed calculated by the speed calculation means 40 and the steering angle measured by the steering angle measurement means 42, and the optical flow calculation means 48 calculates the calculatory optical flow generated by the swing motion using the calculated swing speed. In this example, the calculatory optical flow of each object in the case where the vehicle 10 travels with the swinging motion by adding the optical flow of each object generated when it swings and the optical flow of each object generated when the vehicle 10 travels straight on.

Figure 5:
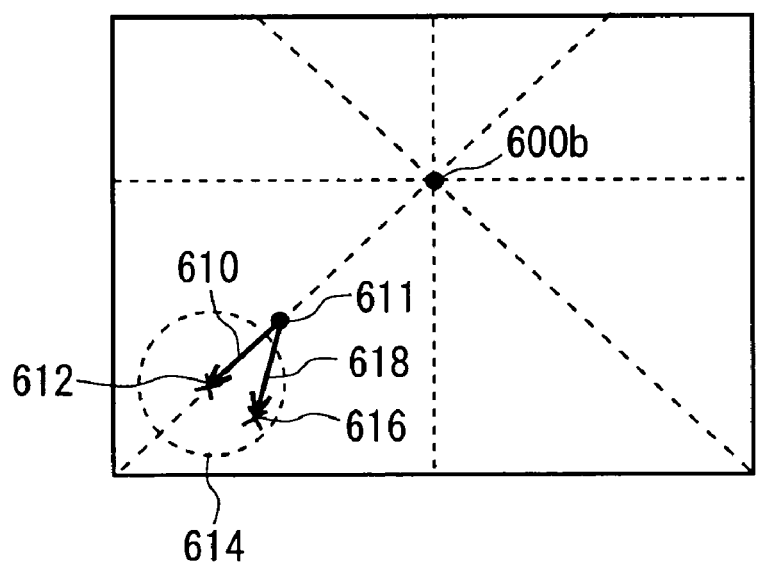
FIG. 5 is a drawing showing another example of operation of correcting mobile vector according to an embodiment of the present invention.

FIG. 5 is drawing explaining another example of operation of correcting the mobile vector according to the present embodiment. The mobile vector calculation means 43 calculates the position of the object, which is included in a first image, in a second image based on the calculatory optical flow of each object calculated by the optical flow calculation means 48. Here, the first image and the second image are images captured continuously. In this example, the second image is an image captured after the first image was captured. The optical flow calculation means 48 calculates the position of the object in the second image by searching the same object using, for example, pattern matching processing in the region centering on the calculated position.

In the example described with reference to FIG. 5, the mobile vector calculation means 43 calculates the position 612 in the second image by calculating the calculatory optical flow 610 on the basis of vanishing point 600*b*, and calculates the position 616 of the object in the second image in the region 614 centering on the position 612. Then, the mobile vector calculation means 43 calculates the mobile vector 618 of the object from the position 611 of the object in the first image and the calculated position 616 of the object in the second image. Thereby, the position of the object may be calculated quickly by using the optical flow. Moreover, since the same object is searched in the region 614 centering on the position which is defined by the optical flow, the mobile vector of the object may be calculated quickly and correctly.

Then, the blurring correction means 44 corrects blurring using the direction and length of the mobile vector 618 calculated by the mobile vector calculation means 43, and the display unit 51 displays the image, of which the blurring is corrected by the blurring correction means 44 corrected, to the driver.

Thus, the image correction apparatus 100 according to the present invention can generate an image without blurring. Especially, the magnitude of the blurring of the object generated by the traveling of the vehicle 10 changes with distance from the vehicle 10 to the object. However, in the present invention, since the blurring is corrected after calculating the magnitude of the blurring according to the distance to each object, the blurring of each object can be corrected appropriately.

Figure 6:
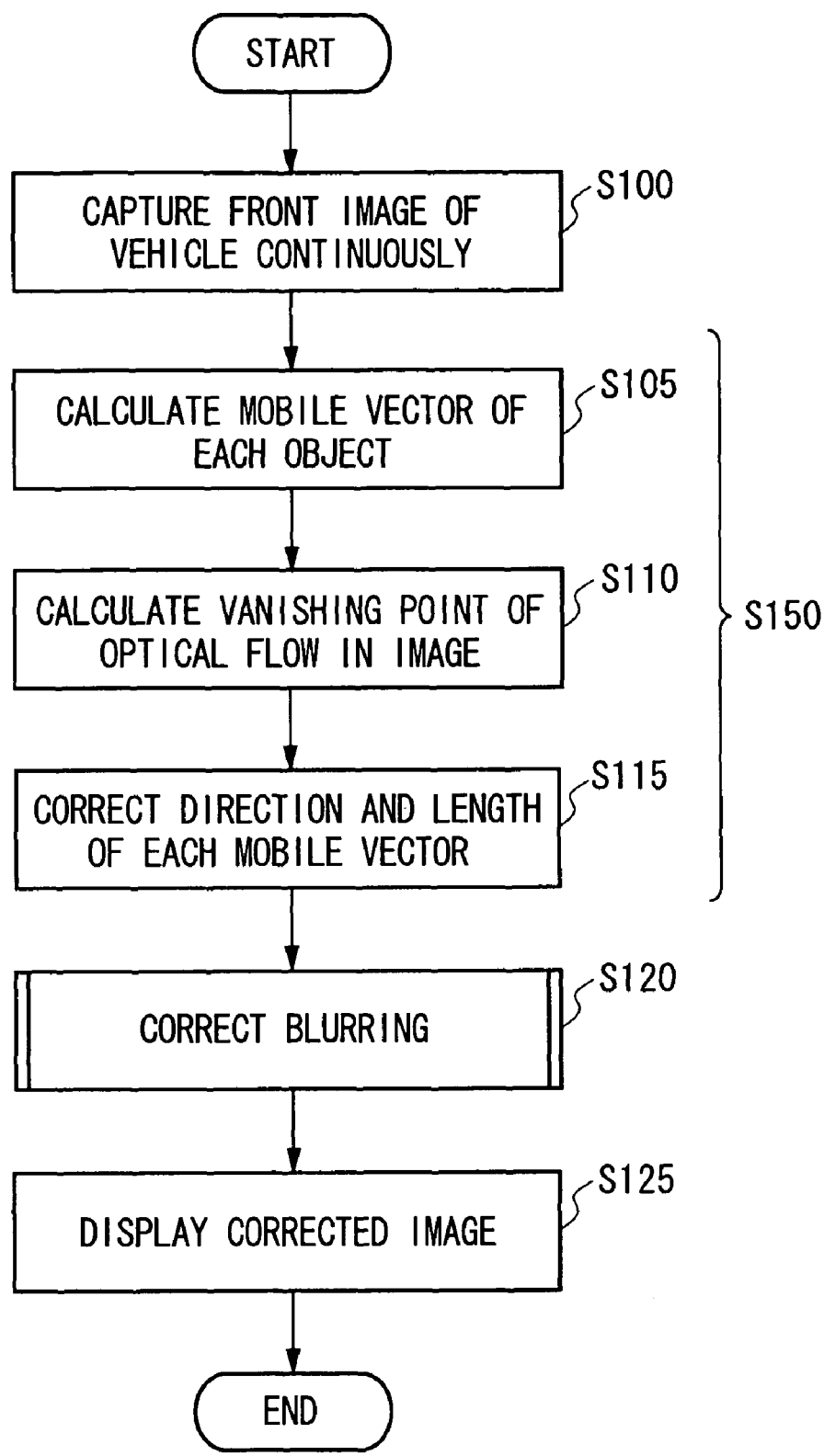
FIG. 6 is a flow chart exemplary showing operation of the image correction apparatus according to an embodiment of the present invention.

FIG. 6 is a flow chart exemplary showing operation of the image correction apparatus 100 according to the present embodiment. The camera 41 is mounted with the vehicle 10 in advance so that the optical axis may be aligned with the traveling direction of the vehicle 10 with which the image correction apparatus 100 is mounted, and it captures an image of the front of the vehicle 10 continuously (S100).

The mobile vector calculation means 43 calculates the mobile vector of each object in the image based on the position of the object in each image captured by the camera 41 continuously (S105). Then, the mobile vector calculation means 43 calculates the vanishing point of the image from the optical flow in the image (S110).

Next, the mobile vector calculation means 43 corrects the direction and length of each mobile vector of each object (S115). Specifically, the mobile vector of each object corrects the direction of the mobile vector assuming that it is directed radially from the vanishing point. Moreover, the mobile vector calculation means 43 calculates the length of radial direction of the mobile vector based on the position of the object in each image continuously captured by the camera. In this case, the radial direction is a direction from the vanishing point to the origin of the mobile vector.

Then, the blurring correction means 44 corrects the blurring of the image captured by the camera 41 using the mobile vector calculated by the mobile vector calculation means 43 (S120), and the display unit 51 displays the image, of which the blurring is corrected by the blurring correction means 44, for the driver (S125). Thereby, the image correction apparatus 100 according to the present invention can display the image without blurring for the driver of the vehicle 10.

Figure 7:
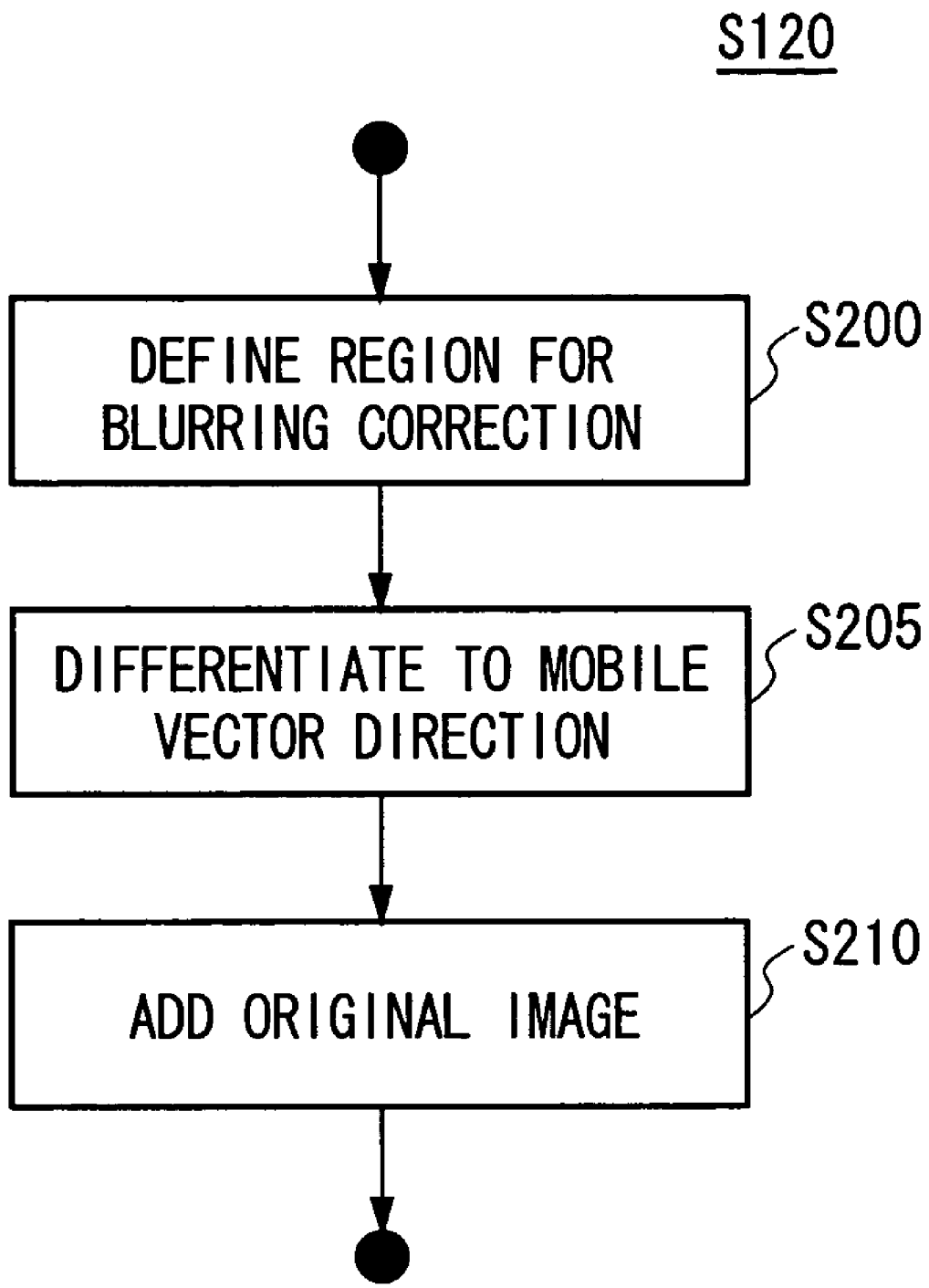
FIG. 7 is a flow chart exemplary showing detailed operation of Step S120.

FIG. 7 is a flow chart exemplary showing detailed operation of Step S120. The blurring generated in the image captured by the camera 41 is produced when the relative position of the object and the vehicle 10 changes during exposure time of capturing the image. Therefore, the direction of the generated produced blurring is equal to the direction of the mobile vector of the object, and the width of the generated blurring is equal to the distance in which the object moved in the image during the exposure time.

Here, the blurring correction means 44 receives the direction and length of the mobile vector calculated by the mobile vector calculation means 43. Then, the blurring correction means 44 defines the region for correcting the blurring based on the direction and length of the received mobile vector (S200). In this case, the blurring correction means 44 defines the direction of the mobile vector with respect to the mobile vector of each outstanding point as a direction for correcting the blurring. Moreover, the blurring correction means 44 calculates the width of the blurring based on the received mobile vector and the exposure time of the image. The blurring correction means 44 of this example calculates the width of the blurring by multiplying the exposure time divided by the timing interval and by which the mobile vector was calculated, and the mobile vector. Thereby, the direction and width for correcting the blurring to each outstanding point are defined.

Then, in the region which is defined by the direction and width for correcting the blurring with respect to the outstanding point, the blurring correction means 44 differentiates the image inside each object to the direction of the mobile vector (S205), and adds the acquired image and the original image (S210), so as to correct the blurring. The blurring correction means 44 corrects blurring generated in each object by performing the above-mentioned processing to all objects. Thereby, the blurring generated in each object may be easily reduced by the image correction apparatus 100 according to the present invention. Then, the flow proceeds to Step S125.

Figure 8:
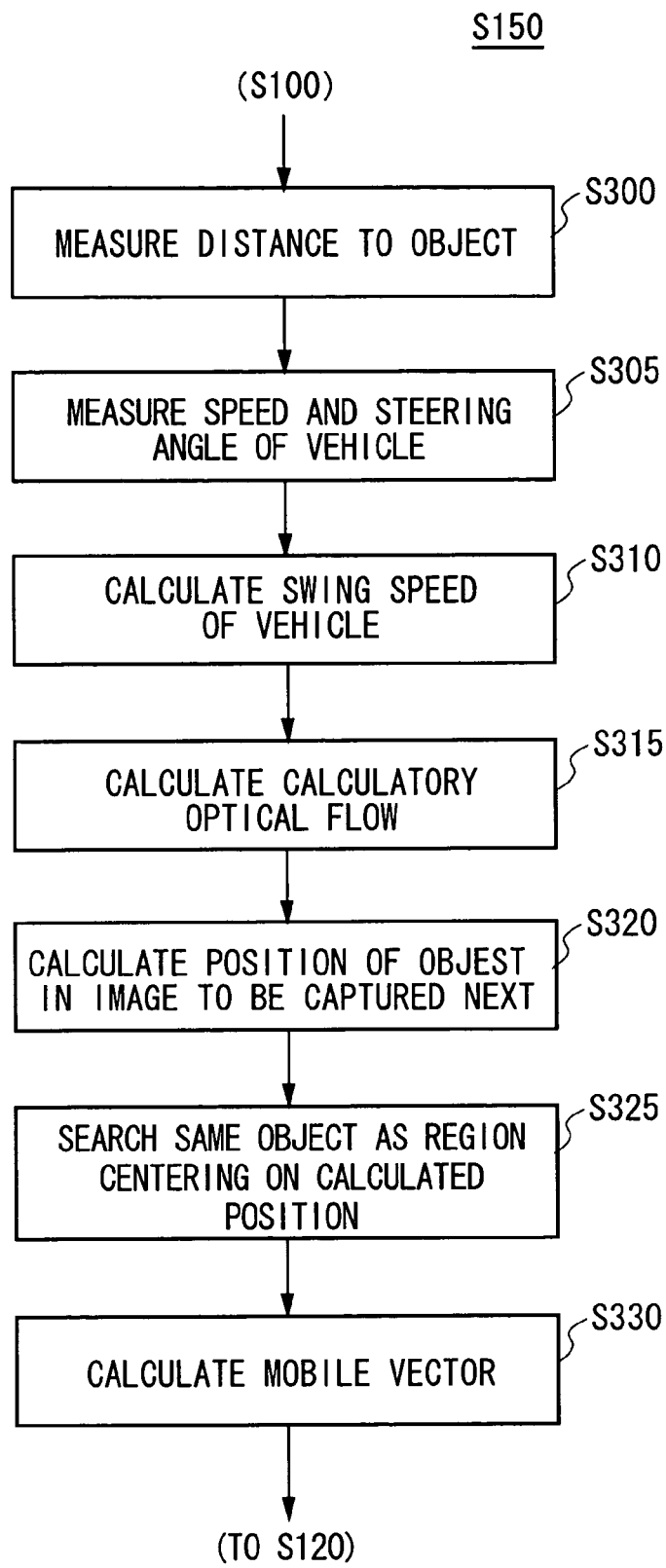
FIG. 8 is a flow chart showing another operation of the image correction apparatus according to an embodiment of the present invention.

FIG. 8 is a flow chart showing another example of operation of the image correction apparatus 100 according to the present embodiment. In this exemplar operation, Step S150 explained below is substituted for Step S105 to Step S115 depicted in FIG. 6 for the image correction apparatus 100.

The camera 41 may be a 3D camera which includes two cameras therein, and the camera 41 measures distance from the vehicle 10 to the object using a gap of the positions of the outstanding points of the object captured by two cameras (S300).

The speed measurement means 40 measures the speed of the vehicle 10, and the steering angle measurement means 42 measures the steering angle of the vehicle 10 (S305). Moreover, the swing speed calculation means 46 calculates the swing speed of the vehicle 10 based on the speed by the speed measurement means 40 and the steering angle measured by the steering angle measurement means 42 (S310). The swing speed calculation means 46 of this example calculates the swing speed of the vehicle 10 by multiplying the speed measured by the speed measurement means 40 and the differential of the steering angle measured by the steering angle measurement means 42.

The optical flow calculation means 48 calculates the calculatory optical flow of each object based on the speed measured by the speed measurement means 40, distance to each object measured by the camera 41, and the longitudinal direction of the object in the image (S315). Furthermore, the optical flow calculation means 48 calculates the calculatory optical flow of each object by calculating the optical flow generated by the swing motion based on the swing speed calculated by the swing speed calculation means and the direction of change of the steering angle, and by adding the result to the previously calculated optical flow.

Then, the mobile vector calculation means 43 calculates the position of the object in the image to be captured next based on the optical flow calculated by the optical flow calculation means 48 (S320), and calculates the position of the object to be captured next by searching the same object using, for example, pattern matching processing in the region centering on the calculated position (S325). Then, the mobile vector calculation means 43 calculates the mobile vector of the object from the position of the calculated object (S330). Then, this flow proceeds to Step S120.

Figure 9:
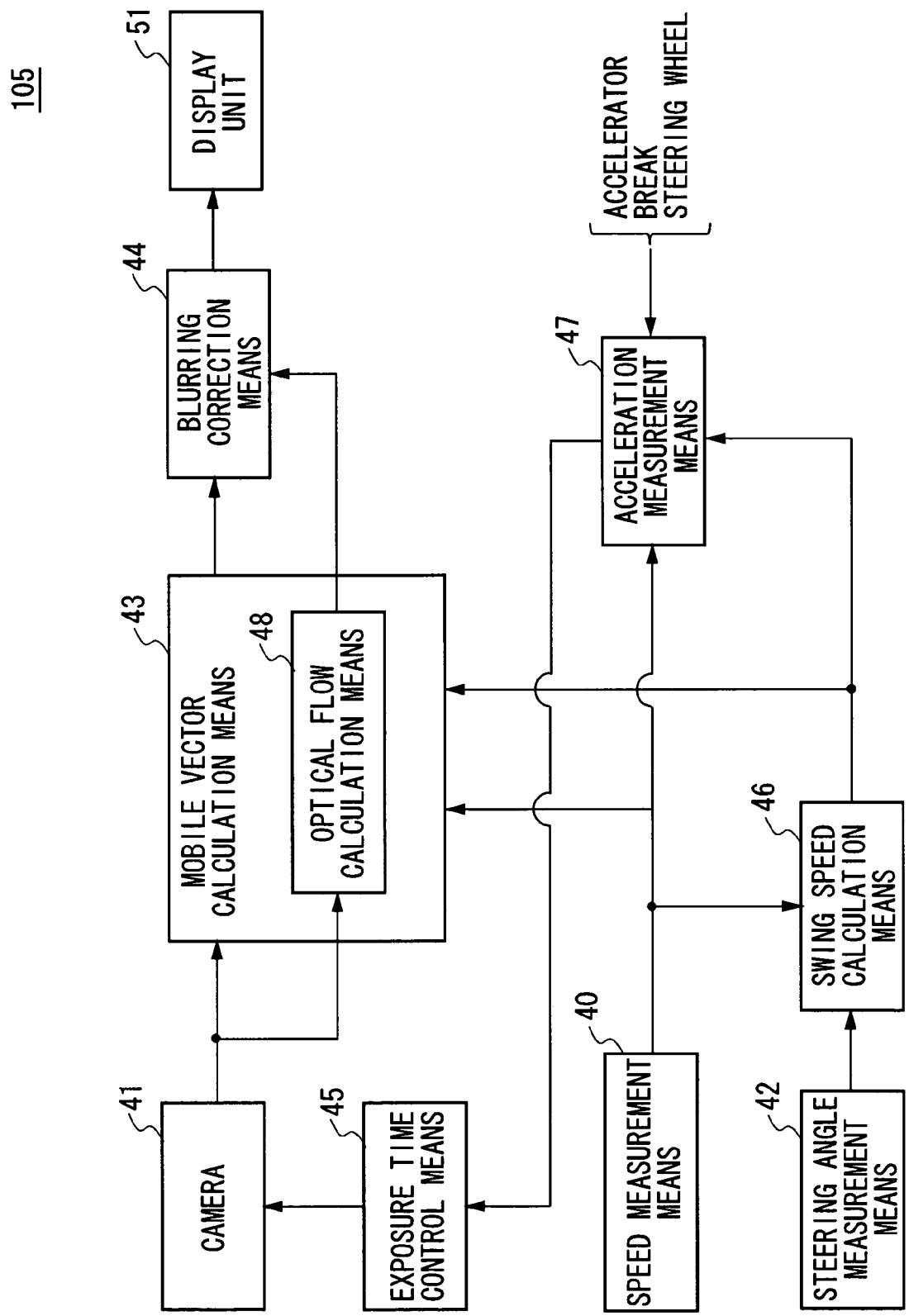
FIG. 9 is a block diagram exemplary showing a functional configuration of an image correction apparatus according to an alternative of the present embodiment of the present invention.

FIG. 9 is a block diagram exemplary showing a functional configuration of the image correction apparatus 105 according to an alternative of the present embodiment. In addition to the function of the image correction apparatus 100 described with reference to FIGS. 1-8, it is an object of the image correction apparatus 105 according to the alternative of the present embodiment to correct the blurring more accurately and efficiently by including function of controlling exposure time when capturing an image, or correcting the blurring by different accuracy for each region in the captured image.

The image correction apparatus 105 includes speed measurement means 40, steering angle measurement means 42, swing speed calculation means 46, acceleration measurement means 47, exposure time control means 45, a camera 41, mobile vector calculation means 43, blurring correction means 44, and a display unit 51. In addition, since the components which bear the same reference numeral as those of the image correction apparatus 100 shown in FIG. 3 have the same or similar function as/to the components described with reference to FIGS. 1-8, explanation of these components will be omitted except for their difference.

The acceleration measurement means 47 measures the acceleration of the vehicle 10. The acceleration measurement means 47 may receive the speed of the vehicle 10 measured by the speed measurement means 40, and, specifically, may measure the acceleration of the vehicle 10 based on time differential of the speed of the vehicle 10. Then, the acceleration measurement means 47 outputs the acceleration of the vehicle 10 to the exposure time control means 45. The exposure time control means 45 controls the exposure time of the camera 41 based on the acceleration of the vehicle 10 received from the acceleration measurement means 47. As well as the blurring correction means 44 of the image correction apparatus 100 described with reference to FIGS. 1-8, the blurring correction means 44 corrects the blurring of the image captured by the camera 41. However, the blurring correction means 44 according to the alternative of the present embodiment partitions the captured image into a plurality of regions, and corrects the blurring of at least in some regions among the plurality of regions by different accuracy with each other.

FIG. 10 shows a first example of the control of the exposure time by the exposure time control means 45 according to the alternative of the present embodiment. In this example, the larger the acceleration of the vehicle 10 measured by the acceleration measurement means 47 is, the shorter the exposure time control means 45 controls the exposure time of the camera 41. For example, when the acceleration α of the vehicle 10 is greater than or equal to 0 and less than A, the exposure time control means 45 controls the exposure time to a standard exposure time predetermined by a user or the like for capturing the image by the camera 41. Moreover, when the acceleration α of the vehicle 10 is greater than or equal to A and less than B, the exposure time control means 45 may shorten the exposure time to 90% of the standard exposure time for capturing the image by the camera 41. Moreover, when the acceleration α of the vehicle 10 is greater than or equal to B and less than C, the exposure time control means 45 may shorten the exposure time to 81% of the standard exposure time for capturing the image by the camera 41.

According to the image correction apparatus 105 according to the alternative of the present embodiment, the blurring correction means 44 can correct the blurring in the captured image. However, when the magnitude of blurring in the image is very large, it may be difficult for the blurring correction means 44 to correct the blurring accurately enough. However, according to the image correction apparatus 105 of the alternative of the present embodiment, the blurring in the image at the time of capturing the image can be reduced by shortening the exposure time when the acceleration of the vehicle 10 is very large. Therefore, a high quality image without blurring can be displayed on the display unit 51.

Moreover, the exposure time control means 47 may control the exposure time of the camera 41 based on change of the swing speed of the vehicle 10. In this case, from the swing speed calculation means 46, the acceleration measurement means 47 may receive the swing speed of the vehicle 10, and may measure change of the swing speed of the vehicle 10 based on the time change of the swing speed. Then, the exposure time control means 45 may control the exposure time of the camera 41 shorter when the change of the swing speed of the vehicle 10 received from the acceleration measurement means 47 is larger.

Thus, the blurring of the image at the time of capturing the image can be reduced by shortening the exposure time even if the swing speed of the vehicle 10 is very large. Therefore, a high quality image without blurring can be displayed on the display unit 51.

Figure 11:
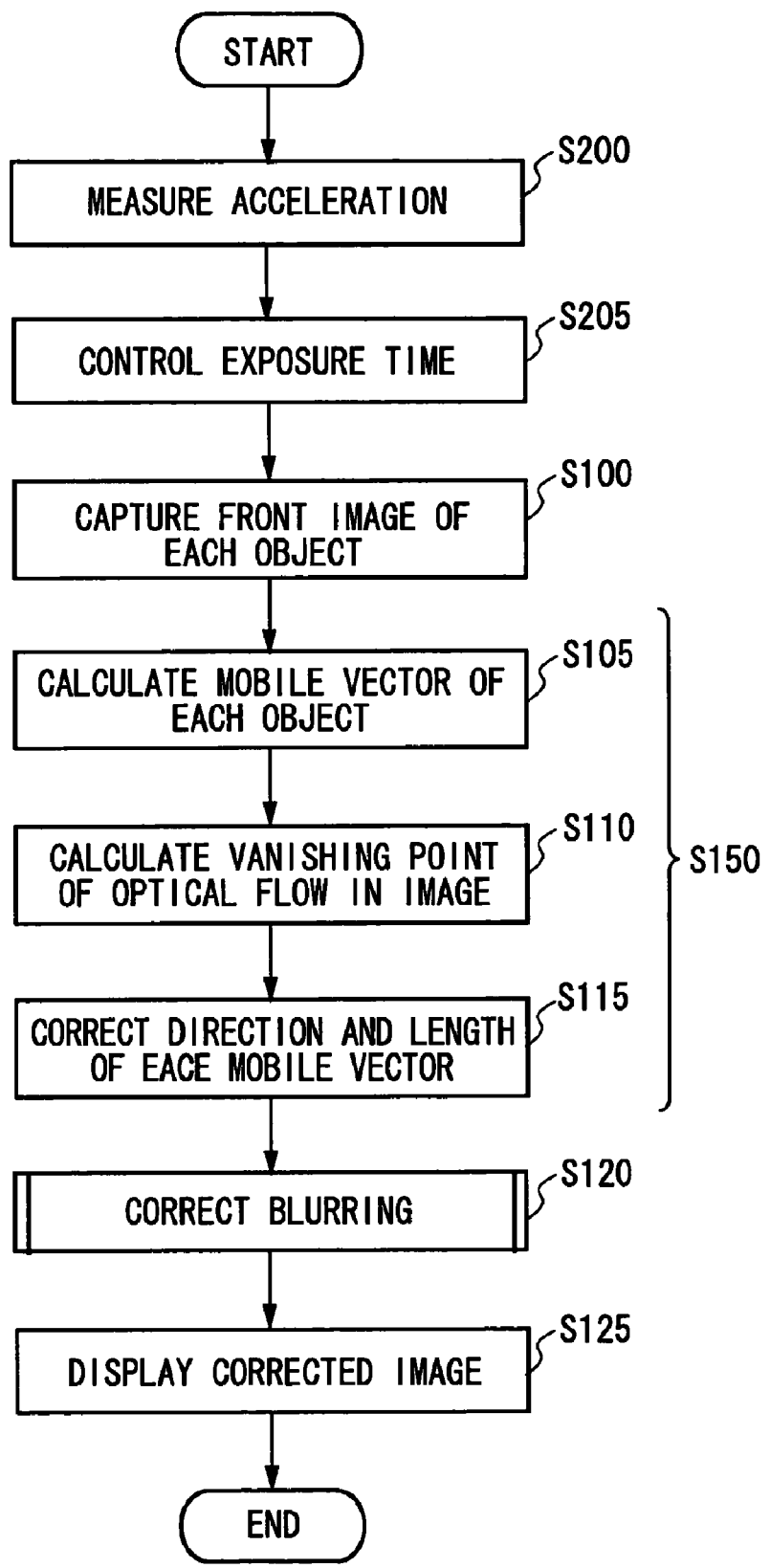
FIG. 11 is a flow chart exemplary showing processing flow of the image correction apparatus according to an alternative of the present embodiment of the present invention.

FIG. 11 is a flow chart exemplary showing processing flow in the image correction apparatus 105 according to the alternative of the present embodiment. In addition, since the steps which bear the same reference numeral as those explained with reference to FIG. 6-8 have the same or similar processing as/to the steps described with reference to FIGS. 6-8, explanation of these steps will be omitted except for their difference.

First, the acceleration measurement means 47 measures the acceleration of the vehicle 10 (S200). Then, the exposure time control means 45 controls the exposure time of the camera 41 based on the measured acceleration (S205). Then, the image correction apparatus 105 performs substantially the same processing as that of the steps bearing the same reference numeral depicted in FIGS. 6-8 from Step S100 to Step S125, so as to correct the blurring of the captured image and to display the corrected image.

FIGS. 12A-12C show other examples of the control of the exposure time by the exposure time control means 45 according to the alternative of the present embodiment. FIG. 12A shows a second example of the exposure time by the exposure time control means 45. FIG. 12B shows a third example of the exposure time by the exposure time control means 45. FIG. 12A shows a fourth example of the exposure time by the exposure time control means 45.

Based on the speed of the vehicle 10 measured by the speed measurement means 40, the acceleration of the vehicle 10 may be measured and the acceleration measurement means 47 may measure change of the swing speed of the vehicle 10 based on the swing speed of the vehicle 10 calculated by the swing speed calculation means 46, as explained with reference to FIG. 9 and FIG. 10. However, instead of this, the acceleration measurement means 47 may measure at least one of the amount of stepping on the accelerator, the amount of stepping on the brake, and the steering angle of the steering wheel of the vehicle 10. Then, when at least one of the amount of stepping on the accelerator, the amount of stepping on the brake, and the steering angle of the steering wheel measured by the acceleration measurement means 47, the exposure time control means 45 may control the exposure time of the camera 41 shorter.

For example, as shown in FIG. 12A, when the variation V1 of the amount of stepping on the accelerator is greater than or equal to 0 and less than A1, the exposure time control means 45 may make the camera 41 capture the image using an exposure time predetermined as a standard exposure time by a user or the like. Then, when the variation V1 of the amount of stepping on the accelerator is greater than or equal to A1 and less than B1, the exposure time control means 45 may shorten the exposure time to 90% of the standard exposure time to make the camera 41 capture the image. Moreover, when the variation V1 of the amount of stepping on the accelerator is greater than or equal to B1 and less than C1, the exposure time control means 45 may shorten the exposure time to 81% of the standard exposure time to make the camera 41 capture the image.

Moreover, for example, as shown in FIG. 12B, when the variation V2 of the amount of stepping on the break is greater than or equal to 0 and less than A2, the exposure time control means 45 may make the camera 41 capture the image using an exposure time predetermined as a standard exposure time by a user or the like. Then, when the variation V2 of the amount of stepping on the break is greater than or equal to A2 and less than B2, the exposure time control means 45 may shorten the exposure time to 90% of the standard exposure time to make the camera 41 capture the image. Moreover, when the variation V2 of the amount of stepping on the break is greater than or equal to B2 and less than C2, the exposure time control means 45 may shorten the exposure time to 81% of the standard exposure time to make the camera 41 capture the image.

Moreover, for example, as shown in FIG. 12C, when the variation V3 of the steering angle of the steering wheel is greater than or equal to 0 and less than A3, the exposure time control means 45 may make the camera 41 capture the image using an exposure time predetermined as a standard exposure time by a user or the like. Then, when the variation V3 of the steering angle of the steering wheel is greater than or equal to A3 and less than B3, the exposure time control means 45 may shorten the exposure time to 90% of the standard exposure time to make the camera 41 capture the image. Moreover, when the variation V3 of the amount of steering angle of the steering wheel is greater than or equal to B3 and less than C3, the exposure time control means 45 may shorten the exposure time to 81% of the standard exposure time to make the camera 41 capture the image.

As mentioned above, by measuring the acceleration or the change of the swing speed of the vehicle based on the variation of the amount of stepping on the accelerator, the amount of stepping on the brake, and the steering angle of the steering wheel for controlling the exposure time, compared with the case where the exposure time is controlled based on the measurement result of the speed by the speed measurement means 40 and the calculation result of the swing speed by the swing speed calculation means 46, the acceleration or the change of the swing speed of the vehicle is detectable with a simple configuration.

Figure 13:
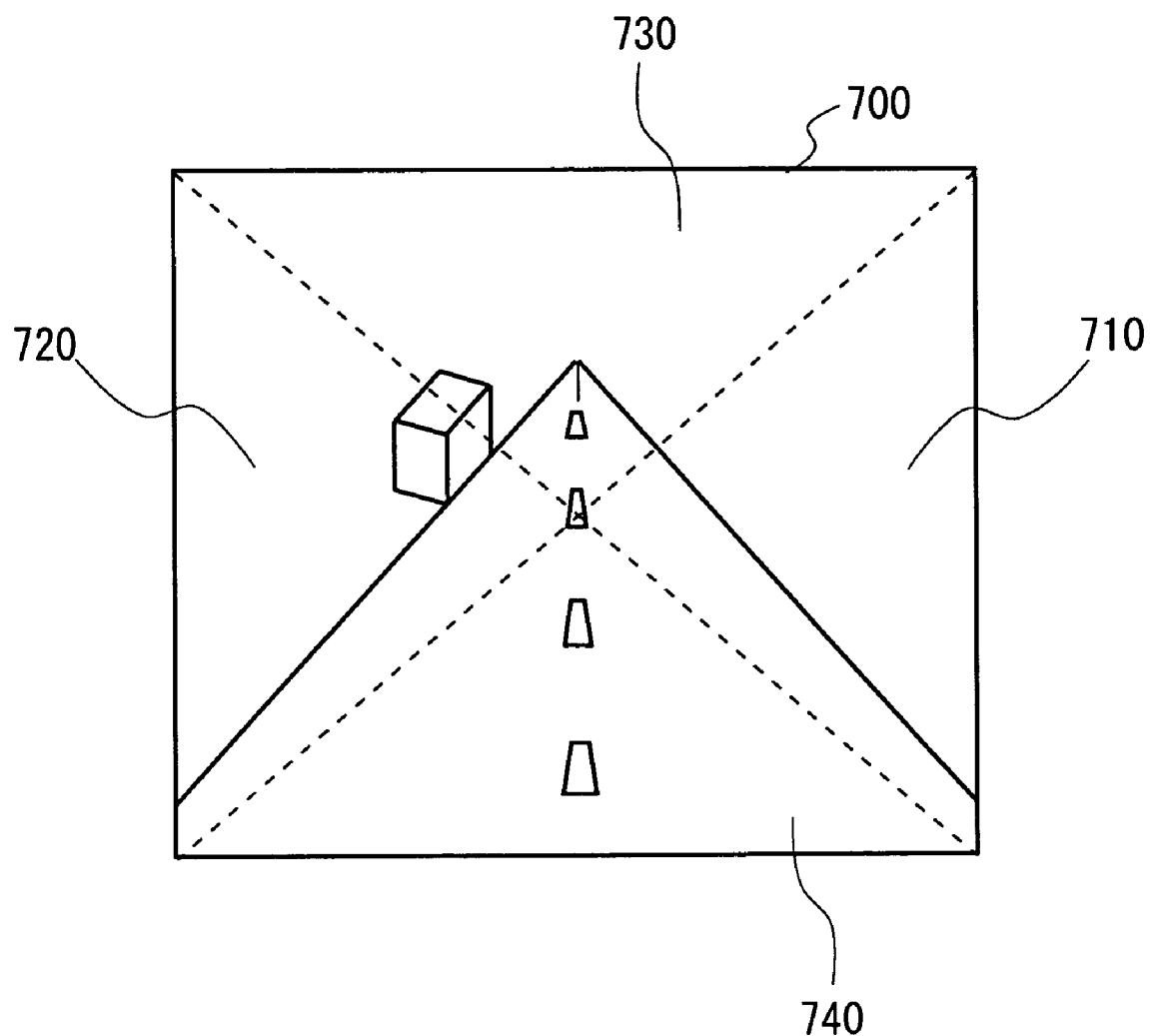
FIG. 13 is a drawing showing an image, which is a first example of an image captured by a camera, according to an alternative of the present embodiment of the present invention.

FIG. 13 shows an image 700, which is a first example of the image captured by the camera 41 according to the alternative of the present embodiment. The blurring correction means 44 partitions the captured image into a plurality of regions, and corrects the blurring of at least in some regions among the plurality of regions by different accuracy with each other when correcting the blurring of each image continuously captured by the camera 41. For example, as shown in FIG. 13, the blurring correction means 44 may partition the captured image 700 into four parts by diagonal lines, and may perform the correction of the blurring in a right region 710 and a left region 720 of the image more accurately than the correction of the blurring in an upper region 730 and a lower region 740 of the captured image.

Here, the accuracy of the blurring correction may be the number of the outstanding points in case of the blurring correction means 44 correcting the blurring for the outstanding points included in each image. Moreover, the accuracy of the blurring correction may be the rank of differential in case of the blurring correction means 44 correcting the blurring in the image by differentiating the image near the outstanding point of each image in the direction of the mobile vector, and adding the acquired image to the original image.

Moreover, as well as the blurring correction means 44, the mobile vector calculation means 43 may also calculate the mobile vector at least in some regions among the plurality of regions in the captured image by different accuracy with each other. Here, the accuracy in calculation of the mobile vector may be detection accuracy of correlation region in the case of using a well known cross correlation method for detection of the corresponding object in the plurality of images.

When capturing the image of the front from a vehicle, the upper part of the image will be occupied by the sky, and the image of the road surface is in the lower part of the image in many cases. However, the user, such as the driver of the vehicle 10, does not pay attention to blurring of the image of the sky or road surface in many cases. Therefore, the time required for the correction processing of the blurring can be shortened, suppressing deterioration of the image quality noticeable to the user by performing the blurring correction to the upper part and the lower part, where the user does not pay much attention to the blurring, less accurately than the left part and the right part.

Moreover, the blurring correction means 44 may omit the blurring correction at least in some regions among a plurality of regions of each captured image. For example, the blurring correction means 44 omits the blurring correction in a region 730 near the upper side and a region 740 near the lower side of the captured image 700. Thereby, the image correction apparatus 105 can further shorten the time required for the blurring correction processing.

Figure 14:
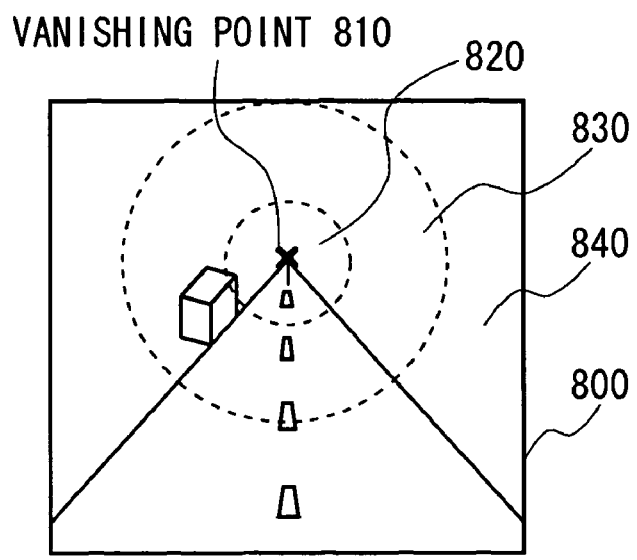
FIG. 14 is a drawing showing an image, which is a second example of an image captured by a camera according to an alternative of the present embodiment of the present invention.

FIG. 14 shows the image 800, which is a second example of the image captured by the camera 41 according to the alternative of the present embodiment. In this example, the mobile vector calculation means 43 calculates the vanishing point 810 of the optical flow of the image 800 using the optical flow calculation means 48 as described with reference to FIG. 4 and FIG. 5. Then, the blurring correction means 44 corrects the blurring in the image 800 at the region near the vanishing point 810 of the optical flow less accurately than the other regions. Specifically, the blurring correction means 44 corrects the blurring in the region 820 near the vanishing point 810 less accurately than the region 830 which exists in the exterior of the region 820. Moreover, the blurring correction means 44 may correct the blurring in the region 830 less accurately than the region 840 where the distance from the vanishing point 810 is farther than the region 830.

The blurring in the image captured by the camera 41 provided in the vehicle becomes smaller in the area nearer the vanishing point. That is, the user does not pay much attention to the blurring in the area near the vanishing point in many cases. Therefore, the time required for the correction of the blurring can be shortened, suppressing deterioration of the quality of the image noticeable to the user by correcting the blurring less accurately in the region near the vanishing point.

In addition, the blurring correction means 44 may omit the blurring correction in the region near the vanishing point instead of correcting the blurring in the region less accurately than the other region. Thereby, the blurring correction means 44 can further shorten the time required for the blurring correction.

Figure 15:
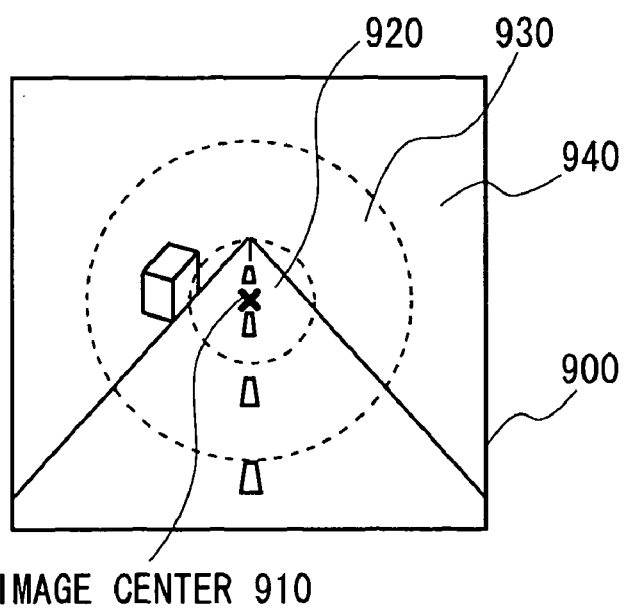
FIG. 15 is a drawing showing an image, which is a third example of an image captured by a camera according to an alternative of the present embodiment of the present invention.

FIG. 15 shows the image 900 which is the example of the third of the image captured with the camera 41 concerning the modification of this embodiment. In this example, the blurring correction means 44 correct blurring in the central region of the image 900 less accurately than regions other than the central region. Specifically, the blurring correction means 44 corrects the blurring in the region 920 near the image center 910 less accurately than the region 930 which exists in the exterior of the region 920. Moreover, the blurring correction means 44 may perform correction of the blurring in the region 930 less accurately than the region 940 where the distance from the image center 910 is farther than the region 930.

When capturing the image of the front of the vehicle by the camera 41 is provided in many cases so that the central point of the image may be located near the vanishing point of the optical flow. Therefore, the time required for the blurring correction can be shortened, suppressing deterioration of the quality of the image noticeable to the user by correcting the blurring in the central region of the captured image less accurately than the other regions. Then, since the calculation of the vanishing point of the optical flow is not necessary in this case, the time required for the blurring correction can be further shortened.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. An image correction apparatus, comprising:
a camera which continuously captures images having image content regarding a view from a vehicle;
mobile vector calculation means of calculating a mobile vector that corresponds to an object in the image content, based on a position of the object in images continuously captured by said camera; and
blurring correction means of defining, using the mobile vector calculated by said mobile vector calculation means, an image region for correcting image blurring and correcting blurring of the defined region of the image using the mobile vector, wherein
the blurring correction means defines the direction of the mobile vector as a direction for correcting the blurring and defines the width for correcting the blurring by calculating the width of the blurring by multiplying the mobile vector and an exposure time divided by a timing interval by which the mobile vector was calculated.

2. The image correction apparatus as claimed in claim 1, wherein said mobile vector calculation means calculates a vanishing point of an optical flow of the image captured by said camera, and corrects direction of the mobile vector assuming that the mobile vector of the object is radially oriented from the vanishing point.

3. The image correction apparatus as claimed in claim 2, wherein said mobile vector calculation means corrects length of the mobile vector based on a direction to which the object in images continuously captured by said camera has been corrected.

4. The image correction apparatus as claimed in claim 1, further comprising:
   distance measurement means of measuring distance from the vehicle to the object;
   speed measurement means of measuring speed of the vehicle; and
   optical flow calculation means of calculating a calculatory optical flow of the object based on speed measured by said speed measurement means and distance to the object measured by said distance measurement means, wherein
   said mobile vector calculation means calculates a position of the object in a second image by calculating a position of the object, which is included in a first image, in a second image based on the optical flow calculated by said optical flow calculation means, and searching the same object in a region centering on the position.

5. The image correction apparatus as claimed in claim 4, further comprising:
   steering angle measurement means of measuring steering angle of the vehicle; and
   swing speed calculation means of calculating swing speed of the vehicle based on speed measured by said speed measurement means and steering angle measured by said steering angle measurement means, wherein
   said optical flow calculation means calculates a calculatory optical flow of the object further based on the swing speed calculated by said swing speed calculation means.

6. The image correction apparatus as claimed in claim 1, wherein said blurring correction means corrects blurring by adding an image, which is obtained by differentiating an image in each object to a direction of the mobile vector, to an original image.

7. The image correction apparatus as claimed in claim 6, further comprising a display unit which displays an image, of which blurring has been corrected by said blurring correction means.

8. The image correction apparatus as claimed in claim 1, further comprising:
   exposure time control means of controlling exposure time of said camera; and
   acceleration measurement means of measuring acceleration of the vehicle; wherein
   the larger the acceleration of the vehicle measured by said acceleration measurement means is, the shorter said exposure time control means controls exposure time of said camera.

9. The image correction apparatus as claimed in claim 8, wherein
   said acceleration measurement means further measures change of swing speed of the vehicle, and
   the larger the change of swing speed of the vehicle measured by said acceleration measurement means is, the shorter said exposure time control means controls exposure time of said camera.

10. The image correction apparatus as claimed in claim 8, wherein
    said acceleration measurement means measures at least one of an amount of stepping on an accelerator of the vehicle, an amount of stepping on a brake, and a steering angle of a steering, and
    the larger at least one variation of an amount of stepping on the accelerator, an amount of stepping on the brake, and a steering angle of the steering wheel is, the shorter said exposure time control means controls the exposure time of said camera.

11. The image correction apparatus as claimed in claim 1, wherein said blurring correction means corrects blurring in the region near right side and left side of each of the images continuously captured by said camera more accurately than correction of blurring in a region near upper side and lower side of each of the images.

12. The image correction apparatus as claimed in claim 11, wherein said blurring correction means omits to correct blurring in a region near upper side and lower side of each of the images continuously captured by said camera.

13. The image correction apparatus as claimed in claim 1, wherein
    said mobile vector calculation means calculates a vanishing point of an optical flow of the image captured by said camera, and
    said blurring correction means corrects blurring in a region near the vanishing point of the optical flow less accurately than the other regions.

14. The image correction apparatus as claimed in claim 1, wherein
    said blurring correction means corrects blurring in a central region of each of the images continuously captured by said camera less accurately than the other regions.

15. An image correction method, comprising:
    a step of continuously capturing by a camera images having image content regarding a view from a vehicle;
    a mobile vector calculation step of calculating a mobile vector that corresponds to an object in the image content based on a position of the object in images continuously captured by the camera;
    a blurring correction step of defining, using the mobile vector calculated by said mobile vector calculation step, an image region for correcting image blurring and correcting blurring of the defined region of the image using the mobile vector, wherein
    the blurring correction means defines the direction of the mobile vector as a direction for correcting the blurring and defines the width for correcting the blurring by calculating the width of the blurring by multiplying the mobile vector and an exposure time divided by a timing interval by which the mobile vector was calculated.

16. The image correction method as claimed in claim 15, wherein a vanishing point of an optical flow of the image captured by said camera is calculated in said mobile vector calculation step, and direction of the mobile vector is corrected assuming that the mobile vector of each object is radially oriented from the vanishing point.

17. The image correction method as claimed in claim 16, wherein length of the mobile vector is corrected in said mobile vector calculation step based on a direction to which the object in images continuously captured by said camera has been corrected.

18. The image correction method as claimed in claim 15, further comprising:
    a distance measurement step of measuring distance from the vehicle to the object;
    a speed measurement step of measuring speed of the vehicle; and
    an optical flow calculation step of calculating a calculatory optical flow of the object based on speed measured in said speed measurement step and distance to the object measured in said distance measurement step, wherein
    a position of the object in a second image is calculated in said mobile vector calculation step by calculating a position of the object, which is included in a first image, in a second image based on the optical flow calculated in said optical flow calculation step, and searching the same object in a region centering on the position.

19. The image correction method as claimed in claim 18, further comprising:
    a steering angle measurement step of measuring steering angle of the vehicle; and
    a swing speed calculation step of calculating swing speed of the vehicle based on speed measured in said speed measurement step and steering angle measured in said steering angle measurement step, wherein
    a calculatory optical flow of the object is calculated in said optical flow calculation step further based on the swing speed calculated in said swing speed calculation step. corrected in said blurring correction step by adding an image, which is obtained by 20. The image correction method as claimed in claim 15, wherein blurring is corrected in said blurring correction step by adding an image, which is obtained by differentiating an image in each object to a direction of the mobile vector, to an original image.

21. The image correction method as claimed in claim 20, further comprising a displaying step of displaying an image, of which blurring has been corrected in said blurring correction step.

22. The image correction method as claimed in claim 15, wherein blurring is corrected in said blurring correction step in the region near right side and left side of each of the images continuously captured by said camera more accurately than correction of blurring in a region near upper side and lower side of each of the images.

23. The image correction method as claimed in claim 22, wherein blurring correction is omitted in said blurring correction step in a region near upper side and lower side of the images continuously captured by said camera.

24. The image correction method as claimed in claim 15, wherein
    a vanishing point of an optical flow of the image captured by said camera is calculated in said mobile vector calculation step, and
    blurring is corrected in said blurring correction step in a region near the vanishing point of the optical flow less accurately than the other regions.

25. The image correction method as claimed in claim 15, wherein
    blurring is corrected in said blurring correction steps in a central region of the images continuously captured by the camera less accurately than the other regions.

26. The image correction method as claimed in claim 15, further comprising a steering angle measurement step of measuring steering angle of the vehicle.

27. The image correction apparatus as claimed in claim 1, wherein the blurring correction means defines the image region for correcting an image for each of all objects in the image content, thereby correcting blurring generated in each of the objects.

28. The image correction apparatus as claimed in claim 15, wherein the blurring correction step of defining the image region for correcting an image is performed for each of all objects in the image content, thereby correcting blurring generated in each of the objects.

* * * * *